Figure 1:
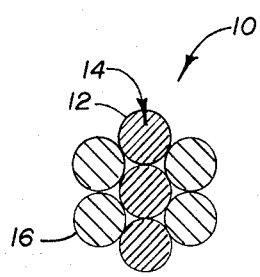

July 19, 1966 J. B. ROCHE ET AL 3,261,908
COMPOSITE ALUMINUM ELECTRICAL CONDUCTOR CABLE
Filed March 26, 1964

INVENTORS
JOHN B. ROCHE
ALEXANDER N. SHEALY
BY
ATTORNEY

United States Patent Office 3,261,908
Patented July 19, 1966

3,261,908
COMPOSITE ALUMINUM ELECTRICAL CONDUCTOR CABLE
John B. Roche and Alexander N. Shealy, Newark, Ohio, assignors to Kaiser Aluminum & Chemical Corporation, Oakland, Calif., a corporation of Delaware
Filed Mar. 26, 1964, Ser. No. 354,994
5 Claims. (Cl. 174—128)

This invention relates to an electrical conductor and more particularly to a multi-strand electrical conductor of composite construction which is especially adaptable and useful for power frequency transmission of electrical energy.

Accordingly it is a purpose of this invention to provide an improved relatively light weight multi-strand conductor of composite construction wherein certain strands making up the conductor have relatively greater electrical conductive properties but less strength and elongation properties than the remaining strands making up the conductor. The multi-strand electrical conductor of this invention is particularly adaptable and useful in those environments where a conductor of composite construction not only must have the overall characteristic of relatively high electrical conductivity but at the same time a relatively high strength to weight ratio.

These and other objects and advantages of the instant invention will become more apparent from a review of the following detailed specification when taken in conjunction with the accompanying figures of the drawing, wherein:

FIGURE 1 illustrates a typical cross-sectional view of one form of multi-strand conductor embodying this invention;

FIGURES 2-6 inclusive illustrate similar cross-sectional views of further multi-strand conductors embodying this invention.

With further reference to the drawings, and particularly FIGURE 1, a multi-strand conductor 10 is illustrated wherein a plurality of strands such as the three strands 12 making up the high strength portion 14 of the conductor together with a plurality of strands such as the four outer strands 16 making up the high conductivity portion thereof. This particular cross-sectional pattern therefore illustrates an innermost core or relatively high strength alloy strand 12 surrounded by an outer concentric layer including two diametrically opposed high strength alloy strands 12 positioned between circumferentially opposed pairs of the outer relatively high conductive strands 16. It is to be understood, of course, that the outer strand layer made up of strands 12 and 16 is tightly wound in a suitable helical fashion in either direction about the innermost core strand 12. Thus, the outer strands 16 are made from material that has a relatively greater electrical conductivity than that of strands 12. The strands 12, on the other hand, are made from a material of relatively greater strength but similar electrically conductive properties as strands 16. Since the outer strands 16 advantageously have the property of high electrical conductivity, a material such as electrical conductor grade aluminum identified as EC–H19 is preferred. Inasmuch as the strands 12 also have good electrical conductivity, these strands 12 enhance or contribute to the over-all electrical conductance of the conductor. Thus strands 12 are advantageously made from a suitable alloy material such as heat-treatable alloy No. 6201–T81 (Aluminum Association designation), in which the primary material is basically the same as the strands 16.

Figure 2:
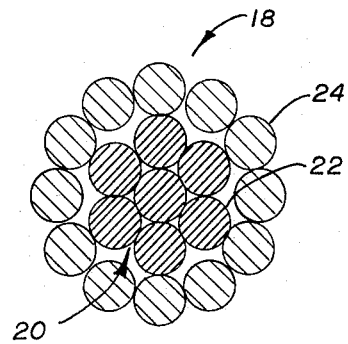

Referring to FIGURE 2 a multi-strand conductor 18 is shown which for the purpose of illustration is shown as being comprised of a core 20 made up of seven high-strength alloy strands 22 of which six are helically and tightly wound about a central strand 22 and surrounded by twelve helically and tightly wound outer strands 24 of EC–H19. The cross-sectional pattern of the conductor 18 in FIGURE 2 preferably has one core strand 22 completely surrounded by a concentric layer of the remaining six core strands 22, all generally disposed in nesting contact with each other. The relatively high conductive strands 24 making up the outer layer of the conductor 18 may or may not be in abutting contact with the associated core strands 22 of the concentric core layer depending upon how the outer strands are spirally wrapped about the core during manufacture. As compared with the multi-strand conductor 10 of FIGURE 1 it is obvious that both the number of the strands 22 of the core 20 and the number of the outer strands 24 have been increased to thereby provide not only for increased electrical conductance but to provide for an increase in strength of the cable or conductor.

Figure 3:
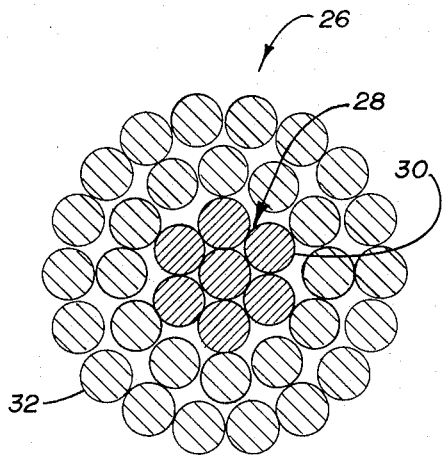

The multi-strand conductor 26 of FIGURE 3 has a core 28, the core strands 30 of which may be the same number as that of the core 20 in FIGURE 2 and the core has the same general cross sectional pattern. An additional layer of strands, however, have been added to increase substantially in number the high conductivity strands so that there are now thirty of these strands 32. The core of the multi-strand conductor of FIGURE 3 also has for all practical purposes the same strength properties as the core of FIGURE 2. The electrical conductance of the cable, however, has been greatly increased in view of the greater number of high conductivity strands that are used.

Figure 4:
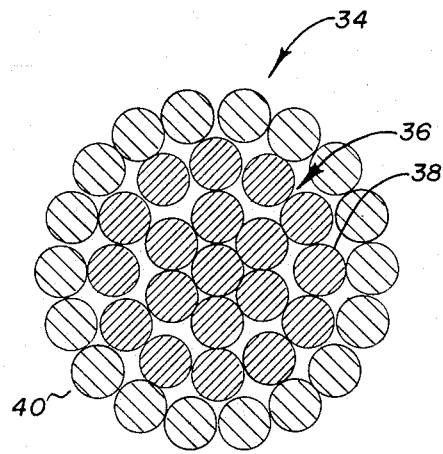

In FIGURE 4 a multi-strand conductor 34 is shown which has a core 36 in which the number of preferably helically wound core or high strength strands 38 and the central strand 38 exceed the number of helically wound outer high conductive strands 40 surrounding the core 36. The particular cross sectional arrangement of the core strands 38 in FIGURE 4 differentiates from the similar pattern shown in FIGURES 2-3 in that an additional concentric layer of core strands 38 is employed. In this embodiment certain of the strands making up the outermost concentric core layer are advantageously in nesting engagement with various strands of the outer conductor layer, as well as with various strands making up the remainder of the core. Although the conductor of FIGURE 4 may be of the same over-all size as that of FIGURE 3 it has a greater strength since it employs a larger number of high-strength alloy strands.

Figure 5:
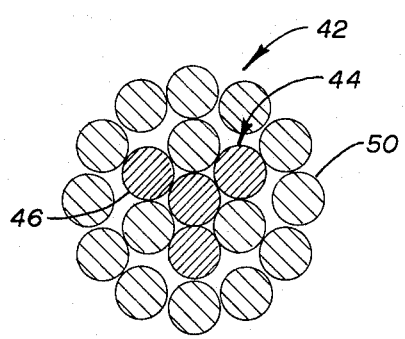

In FIGURE 5 a multi-strand conductor 42 is disclosed wherein the three alloy strands 46 of the six-strand layer 44 are preferably interdigited in a symmetrical fashion with the three EC aluminum strands 50 in that layer. As compared to the conductor 18 in FIGURE 2, it is obvious that the conductor 42 is of decreased strength but of greater electrical conductance by virtue of the fact that three high-conductivity strands are used to replace three high-strength alloy strands. This, together with the comparison of conductors 26 of FIGURE 3 and 34 of FIGURE 4 cited above demonstrates the flexibility made possible by the instant invention to meet conductor strength and conductance requirements at optimum cost and without having to resort to different strand diameters.

The above described patterns for the multi-strand conductors 10, 18, 26, 34 and 42 are to be considered as preferred embodiments of the invention and other cross-sectional patterns for a multi-strand conductor are contemplated by the instant invention. Furthermore, although the strands in the aforedescribed FIGURES 1-5 have substantially the same diameter, the multi-strand conductor of the instant invention can be comprised of strands of different diameters, i.e. for different strand layers.

In the embodiments illustrated in the above FIGURES 1-5, the preferred materials for the core strands and the outer conductor strands are respectively an aluminum alloy in combination with an electrically conductive grade of aluminum. The multi-strand conductor in one application of the aforedescribed embodiments utilizes outer relatively high conductive strands of aluminum designated by the Aluminum Association as Electrical Conductor Grade, and for overhead conductors is commercially identified as EC-H19 wire, which has an electrical conductivity of at least 61% while the high strength alloy strands are made from a heat treated aluminum alloy commercially identified as 6201-T81 wire, which has an electrical conductivity of at least 52½%. These conductivity percentages were established according to the American Society for Testing Materials and are based on an equal volume of the International Annealed Copper Standard.

It is preferable to use a suitable heat treated aluminum alloy for the aforedescribed high strength alloy strands of the multi-strand conductor. The chemical composition limits of such an aluminum alloy as listed with the Aluminum Association is as follows:

| Elements: | 6201 aluminum alloy, percent |
|---|---|
| 1. Copper | 0.10 |
| 2. Iron | 0.50 |
| 3. Silicon | 0.50-0.90 |
| 4. Manganese | 0.03 |
| 5. Magnesium | 0.60-0.90 |
| 6. Zinc | 0.10 |
| 7. Chromium | 0.03 |
| 8. Boron | 0.06 |
| 9. Other elements, *each* | 0.03 |
| 10. Other elements, *total* | 0.03 |
| 11. Aluminum | Remainder |

It is to be understood that in the above composition the percentages are maximum figures unless shown as a range.

The chemical composition of electrical conductor grade EC-H19 has 99.45% minimum aluminum. The H19 is a temper designation that indicates the metal has been strain hardened to an extra hard temper. The 6201 designation of the aluminum alloy indicates the composition as set forth in the above paragraph, while T81 designates solution heat treated, cold worked and then artificially aged.

Although multi-strand conductors of composite construction are old in the art, none have the various conductor elements provided with the specific properties noted above and arranged in the same unique fashion as proposed in the instant invention in order to take maximum advantage of the specific properties of the various conductor elements. For example, it is old in the art to employ a tightly wound multi-strand conductor for power transmission at extra high voltages wherein the properties of the core are used for the primary purpose of providing strength while the properties of the outer strands have the primary purpose of providing electrical conductivity. In the conductors of the prior art the core was usually composed of a different metal from the outer strands to achieve the property of strength. Obviously, a multi-strand conductor of different metals presents additional problems as regards different coefficients of expansion, different densities and corrosion such as that occasioned by galvanic action.

The multi-strand conductor of FIGURES 1-5 avoids these additional problems that affect the use of the conductor by providing strands of relatively high strength aluminum alloy in combination with relatively high conductive strands or strands of a grade of aluminum which has excellent electrically conductive characteristics. In effect, the metals of the various strands for all practical purposes are the same so that all strands of the multi-strand conductor have substantially the same characteristic of weight per unit length and substantially the same coefficient of expansion. Moreover, by using strands which all have the same coefficient of expansion no one strand will expand disproportionately in an excessive amount with respect to any other strand. Thus, the usual tensile loads to which such conductors are exposed during use are not deleteriously influenced by temperature or other operational characteristics of the conductor.

The aluminum alloy strands employed in the instant invention as compared to conventional prior art such as the steel cores in an ACSR aluminum cable, still provides effectively the same strength with less weight per unit length as well as substantially the same increased elongation under tensional loads. An additional feature of the aluminum alloy of the instant invention is that it has the characteristic of greater elongation than the EC aluminum strands. With such greater elongation and greater strength, the alloy is capable of taking a greater part of the tensional load to which the conductor is subjected to during its life. When any multi-strand conductor is first installed, the tensional load is initially distributed as a function of the area of the strands. However, during the life of the installed conductor, the tensional load distribution tends to shift. One factor causing the tendency of the tensional load to shift is creep or non-elastic stretch of the conductor strands. Therefore, after installation a greater part of the tensional load is taken up by the alloy strands since the long time creep of the alloy strands will be less than that of the EC aluminum strands. However, the prior art conductors such as the steel core of "ACSR" are subjected to the additional factors of greater density and different expansion coefficients of the steel core and the aluminum conductor strands. These additional factors tend to continually shift a great part of the tensional load to the core at high temperatures and to overstress the aluminum at low temperatures. Accordingly, the multi-strand conductor of the instant invention is subject to less concentration of tensional loads when the conductor is suspended between two points because of its temperature coefficient of expansion being substantially the same for all strands and is less apt to fail during use.

One of the principal advantages of the multi-strand conductor proposed is that the aluminum alloy strands not only provide the strength needed but even enhance rather than detract from the electrical conductivity of the cable as a whole. When used in combination with strands of an electrically conductive grade of aluminum, fewer EC aluminum strands are needed to meet a given conductance requirement. Accordingly, the multi-strand conductor of relatively small cross-section can be readily tailored to meet the particular strength and electrical conductivity requirements for any given application. A unique feature of tailoring the conductor for different applications, assuming all strands are of the same diameter, is that an EC strand can be selectively exchanged for an alloy strand to thereby meet the required new properties of strength and electrical conductance. Another unique feature involved in tailoring the conductor by selectively exchanging an alloy strand and an EC strand is that the overall weight of the conductor remains substantially the same. An example of such an exchange is the aforedescribed FIGURES 3-4 with the same overall number of strands employed, but wherein the number of alloy strands 38 in FIGURE 4 have been increased while the number of the EC aluminum strands 40 have been proportionately reduced. Similarly, FIGURES 2 and 5 have the same overall total number of strands but the alloy strands and EC aluminum strands have been selectively interchanged. The multi-strand conductor is especially adaptable for power transmission lines at extra high voltages often identified by the abbreviation, "EHV," wherein the voltage carried ranges from 345,000 volts to 1,000,000 volts.

Another notable property of the multi-strand conductor is that the aluminum making up each set of strands is relatively corrosion resistant. Further the solution potential of each set of strands is approximately the same and therefore the cable assembly is not subject to galvanic action that normally occurs in cable structures of dissimilar and exposed materials. Thus, the strength of the alloy strands cannot be seriously affected by corrosion during use.

The unique structure and advantage of the conductor of the instant invention will be further apparent from a comparison of this conductor with a multi-strand conductor of the prior art, such as an "ACSR," i.e., Aluminum Conductor Steel Reinforced. A listing of the properties of the two conductors is as follows:

|  | Conductors of Application | | ASCR |
|---|---|---|---|
| Construction | *4/3 | *3/4 | *6/1 |
| Diameter of Strands | 0.1878 | 0.1878 | 0.1878 |
| Actual Area (circular Mills): | | | |
| EC–H19 | 141,076 | 105,807 | 211,614 |
| 6201 | 105,807 | 141,076 | |
| Steel | | | 35,269 |
| Total Area | 246,883 | 246,883 | 246,883 |
| Percentage of Area: | | | |
| EC–H19 | 57.15 | 42.85 | 85.7 |
| 6201 | 42.85 | 57.15 | |
| Steel | | | 14.3 |
| Total | 100.00 | 100.00 | 100.0 |
| Equivalent Conductivity (IACS), percent (Based on International Annealed Copper Standards) | 57.9 | 56.6 | 53.1 |
| Weight, lbs. per 1000 ft. cable length: | | | |
| EC–H19 | 132.5 | 99.3 | 197.7 |
| 6201 | 99.3 | 132.5 | |
| Steel | | | 93.4 |
| Total | 231.8 | 231.8 | 291.1 |
| Rated Strength | 6,330 | 6,890 | 8,420 |
| Strength/Weight Ratio | 27,310 | 29,720 | 28,920 |

*The 4/3 construction is shown in Figure 1 while the 3/4 construction is shown in Figure 5 with the outer strand layer removed. The 6/1 ASCR conductor is the same cross-sectional pattern of Figure 1 wherein the core strand is steel and the outer strand layer is six strands of E.C. grade aluminum.

It can be obviously concluded from the above figures, that the conductor of the instant invention not only provides greater equivalent electrical conductivity than the ACSR conductor but also provides less weight per unit length and a more controllable strength to weight ratio, to meet given requirements.

Figure 6:
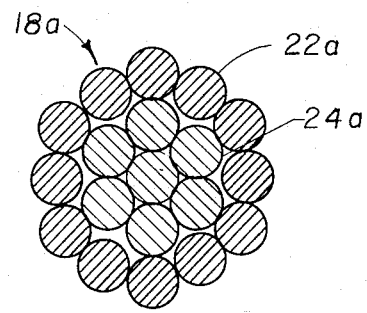

In a further advantageous embodiment of this invention and as indicated for example in FIGURE 6, the outer layer of high strength alloy strands 22a are made up as an outer layer located on the outside of the cable while the relatively higher conductive EC aluminum strands 24a can be disposed on the inside of the cable structure while it still retains all of the advantages of the conductor assembly of the instant invention.

One advantage of such an interchange of strands is that the outermost layer of alloy strands presents a relatively harder surface. This harder surface remains substantially smooth and unbroken during handling and installation of the conductor or engagement of the conductor by the customary suspension elements or other accessories to thereby minimize the phenomena of corona effect and consequent current loss, thereby as well as to minimize interference to radio and TV reception in proximity of the transmission lines.

An advantageous embodiment of the invention has been disclosed and described. It will be obvious therefore that various changes and modifications may be made therein without departing from the spirit or scope thereof as defined by the following claims.

What is claimed is:

1. In a relatively light weight multi-strand conductor adaptable for electrical power transmission, the combination of at least two metallic strands, one strand consisting of an electrically conductive grade of aluminum and the other strand consisting of an aluminum-magnesium-boron-silicon alloy, the second strand having an electrical conductivity of at least 52½%, said percentage based on an equal volume of the International Annealed Copper Standard, said second strand having greater strength and greater elongation than said first strand, and the coefficient of expansion and corrosion resistance of each of said strands being substantially the same.

2. In a relatively light weight multi-strand conductor assembly adaptable for power transmission at extra high voltages, the combination of two sets of metallic strands, the strands in one set of strands each consisting of an electrically conductive grade of aluminum and the strands in said other set of strands each consisting of an aluminum-magnesium-boron-silicon alloy having an electrical conductivity of at least 52½%, said percentage based on an equal volume of the International Annealed Copper Standard, the strands in said second set of strands each having relatively greater strength and greater elongation than the strands in said first set of strands, and the coefficient of expansion, and corrosion resistance of the strands in each set of strands being substantially the same.

3. A multi-strand conductor as set forth in claim 2 wherein the strands in said first set of strands are arranged on the outside of said second set of strands.

4. A multi-strand conductor as set forth in claim 2 wherein the strands of said second set of strands are arranged on the outside of said first set of strands.

5. In a multi-strand conductor adaptable for electrical power transmission, the combination of a plurality of core strands and a plurality of outer conductor strands, said outer conductor strands consisting of an electrically conductive grade of aluminum and the core strands consisting of the elements, in percent by weight, copper up to 0.10%, iron up to 0.50%, manganese up to 0.03%, zinc up to 0.10%, chromium up to 0.03%, boron up to 0.06%, silicon about 0.50% to 0.90%, magnesium about 0.60% to 0.90%, and the balance aluminum and having an electrical conductivity of at least 52½%, said conductivity percentage based on an equal volume of the International Annealed Copper Standard, the core strands having relatively greater strength and greater elongation than said outer conductor strands and the coefficient of expansion, and corrosion resistance of the outer conductor strands and the core strands being substantially the same.

References Cited by the Examiner

FOREIGN PATENTS 304,031 1/1929 Great Britain.
344,194 3/1931 Great Britain.

OTHER REFERENCES

Standard Cable Strandings, Anaconda Publication C–78, Anaconda Wire and Cable Company, page 4, 1949.

Ser. No. 438,395, Fustier, (A.P.C.), published June 1, 1943, now abandoned.

ROBERT K. SCHAEFER, *Primary Examiner.*

JOHN F. BURNS, *Examiner.*

D. A. KETTLESTRINGS, *Assistant Examiner.*

UNITED STATES PATENT OFFICE
CERTIFICATE OF CORRECTION

Patent No. 3,261,908            July 19, 1966

John B. Roche et al.

It is hereby certified that error appears in the above numbered patent requiring correction and that the said Letters Patent should read as corrected below.

Column 3, in the table, opposite Element 10, for "0.03" read -- 0.10 --; line 67, strike out "as", second occurrence.

Signed and sealed this 25th day of June 1968.

(SEAL)
Attest:

Edward M. Fletcher, Jr.

Attesting Officer

EDWARD J. BRENNER

Commissioner of Patents